(12) United States Patent
Katayama (10) Patent No.: US 8,284,645 B2
(45) Date of Patent: Oct. 9, 2012

(54) CYCLIC MEMORY AND DISC DEVICE

(75) Inventor: Tsuyoshi Katayama, Kyoto (JP)

(73) Assignee: Panasonic Corporation, Osaka (JP)

( * ) Notice: Subject to any disclaimer, the term of this patent is extended or adjusted under 35 U.S.C. 154(b) by 1092 days.

(21) Appl. No.: 12/279,255

(22) PCT Filed: Feb. 15, 2007

(86) PCT No.: PCT/JP2007/052680
§ 371 (c)(1),
(2), (4) Date: Aug. 13, 2008

(87) PCT Pub. No.: WO2007/094387
PCT Pub. Date: Aug. 23, 2007

(65) Prior Publication Data
US 2009/0022022 A1    Jan. 22, 2009

(30) Foreign Application Priority Data
Feb. 15, 2006    (JP) .................................. 2006-037440

(51) Int. Cl.
G11B 20/20    (2006.01)
G11B 27/10    (2006.01)
(52) U.S. Cl. ................ 369/47.33; 369/47.32; 369/47.34
(58) Field of Classification Search .................. None
See application file for complete search history.

(56) References Cited

U.S. PATENT DOCUMENTS
6,091,941 A * 7/2000 Moriyama et al. ............ 455/126
6,882,608 B2 * 4/2005 Watanabe et al. .......... 369/47.32
(Continued)

FOREIGN PATENT DOCUMENTS
JP    02-226525    9/1990
(Continued)

OTHER PUBLICATIONS
Japanese Office Action issued in Japanese Patent Application No. 2008-500536, mailed Mar. 8, 2011.

Primary Examiner — Mohammad Ghayour
Assistant Examiner — Huy D Nguyen
(74) Attorney, Agent, or Firm — McDermott Will & Emery LLP (57) ABSTRACT

Provided is an orbiting memory capable of suppressing residual deviation even when a phase difference is caused between a signal to be compensated and information stored in a memory to be fed back and a disc device using the orbiting memory. The disc device includes: an adder to which a signal (s10) to be compensated and having a cyclic frequency component such as a control system error signal is inputted; and a feed back signal system for successively updating and storing an output signal of the adder for each cycle in a memory and inputting one-cycle information stored in the memory to the adder. The feed back signal system includes: a filter unit for outputting a signal contained in a learning band which is arbitrarily set among output signals from the adder; the memory for successively updating and storing the output signal of the filter unit; a phase correction unit capable of arbitrarily setting a phase amount when inputting the output of the memory to the adder; and a gain element for multiplying the one-cycle information subjected to the phase correction by the phase correction unit by a value not smaller than 0 and not greater than 1 and inputting the obtained value to the adder.

6 Claims, 6 Drawing Sheets

U.S. PATENT DOCUMENTS

| | | | |
|---|---|---|---|
| 7,012,969 B2* | 3/2006 | Ode et al. | 375/296 |
| 7,042,827 B2* | 5/2006 | Cho et al. | 369/124.1 |
| 7,079,461 B2 | 7/2006 | Cho et al. | |
| 2001/0007435 A1* | 7/2001 | Ode et al. | 330/149 |
| 2002/0118618 A1 | 8/2002 | Cho et al. | |
| 2003/0016607 A1 | 1/2003 | Cho et al. | |
| 2005/0047521 A1* | 3/2005 | Ishikawa et al. | 375/296 |
| 2010/0195456 A1* | 8/2010 | Yasukouchi | 369/44.32 |

FOREIGN PATENT DOCUMENTS

| | | |
|---|---|---|
| JP | 6-301996 | 10/1994 |
| JP | 06-301996 A | 10/1994 |
| JP | 9-50303 | 2/1997 |
| JP | 09-050303 A | 2/1997 |
| JP | 11-161972 | 6/1999 |
| JP | 11-161972 A | 6/1999 |
| JP | 2002-208240 | 7/2002 |
| JP | 2002-208240 A | 7/2002 |
| JP | 2003-006898 | 1/2003 |
| JP | 2006-73178 | 3/2006 |
| JP | 2006-073178 A | 3/2006 |

* cited by examiner

CYCLIC MEMORY AND DISC DEVICE

RELATED APPLICATIONS

This application is the U.S. National Phase under 35 U.S.C. §371 of International Application No. PCT/JP2007/052680, filed on Feb. 15, 2007, which in turn claims the benefit of Japanese Application No. 2006-037440, filed on Feb. 15, 2006, the disclosures of which Applications are incorporated by reference herein.

TECHNICAL FIELD

The present invention relates to a cyclic memory used for controlling a control system, and a disc device including the cyclic memory.

BACKGROUND ART

In recent years, with progress in speed-up and high-densification for an optical disc, accuracy improvement in optical servo for maintaining a focal point of a laser beam on an information recording track of the disc in an optical disc device has been rapidly demanded. As a means for improving the accuracy of optical servo, repetitive control (learning control) has attracted attention. The repetitive control controls, with a one-period previous deviation signal being stored in a memory, a control system according to the stored signal.

When performing such repetitive control, however, since the signal of just-previous one period is stored in the memory, if a non-periodic signal caused by flaws on the disc or disturbance such as vibration applied to the device is undesirably given as an input signal, unnecessary noise might be mixed into the control system by learning this signal. Accordingly, there have conventionally been demanded a control system which can perform stable control even when such disturbance is applied, and a repetitive control method which can eliminate the influence of the unnecessary non-periodic component that might be undesirably learned by the memory.

As a means to solve the above-mentioned problem, Patent Document 1 discloses a cyclic memory which constitutes an input signal to a learning memory which includes a positive-feedback loop provided for repeatedly memorizing an input signal for one period, by a present signal that is multiplied by a gain element k ($0 \leq k \leq 1$) and an one-period previous output of the learning memory 4 that is multiplied by a gain element 1−k, and makes the information inside the learning memory, by the value of k, function so as to be not only the one-period previous information but also the information over many periods which are weighted.

Figure 6:
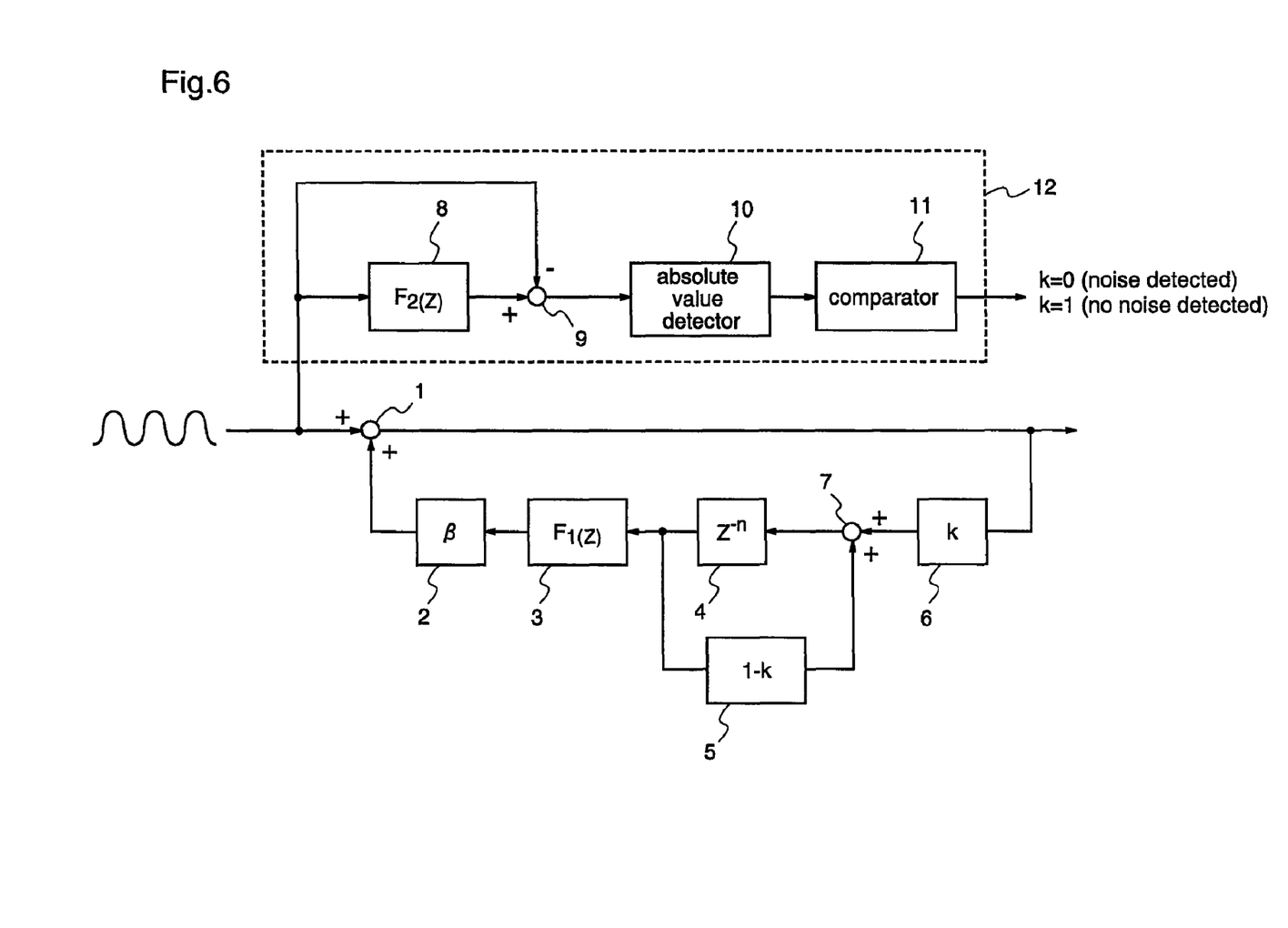
FIG. 6 is a diagram illustrating the construction of the conventional cyclic memory.

FIG. 6 is a diagram illustrating the construction of the cyclic memory included in the conventional optical disc device which is disclosed in Patent Document 1.

In FIG. 6, reference numeral 1 denotes a first adder for adding a compensation target signal having a periodic component such as an error signal in the control system of the optical disc device, which is a target to be followed, and an output of the cyclic memory. Reference numeral 2 denotes an attenuation gain β for varying the degree of learning. Reference numeral 3 denotes a low-pass filter, numeral 4 denotes a memory for storing frequency components for one rotation period of the disc, and numerals 5 and 6 denote gain elements for switching the signals to be stored in the memory 4. Reference numeral 7 denotes a second adder, and an output of this second adder 7 is stored in the learning memory 4. Reference numeral 12 denotes a correlation detection unit for judging whether the input compensation target signal has a periodicity or not, and it is constituted by a low-pass filter 8, a subtracter 9, an absolute value detector 10, and a comparator 11.

In the cyclic memory having the above-described construction, initially, the correlation detection unit 12 judges whether the inputted compensation target signal having a periodic component has a periodicity or not, and detects whether an error signal having no correlation which is caused by such as noise, disturbance, or flaws on the disc surface is superposed on the compensation target signal or not. When the correlation detection unit 12 judges that there is a correlation (no noise detected), the value of k of the gain element 5,6 is set at k=1, while when it is judged that there is no correlation (noise detected), the value of k of the gain element 5,6 is set at k=0.

Then, the inputted compensation target signal and the output signal of the gain element 2 are added by the first adder 1, and the resultant signal becomes an output of the cyclic memory. The output of the cyclic memory is multiplied by k in the gain element 6, and the k-multiplied signal and a value obtained by multiplying the output of the learning memory 4 by 1−k in the gain element 5 are added in the second adder 7, and the resultant signal is input to the learning memory 4. The output of the learning memory 4 is input to the low-pass filter 3, and multiplied by the gain β that is not larger than 1 in the gain element 2 to be fed back to the first adder 1. Thereby, the long-term periodic component can be stored.

When k=1 is outputted from the correlation detection unit 12, the signal equivalent to one rotation of the disc, which is outputted from the first adder 1, is stored in the learning memory 4 via the gain element 6, and the signal stored in the learning memory 4 is fed back to the adder 1 via the low-pass filter 3 and the gain element 2 to satisfy the stability condition in the repetitive control. On the other hand, when k=0 is outputted from the correlation detection unit 12, it is stopped to store the signal equivalent to one disc rotation that is outputted from the first adder 1 into the learning memory 4 by the gain element 6, and the signal equivalent to one disc rotation that has just previously been stored in the learning memory 4 is again stored via the gain element 5, and the stored signal is fed back to the adder 1 via the low-pass filter 3 and the gain element 2.

By adopting the above-described construction, even when a disturbance or the like is mixed into the compensation target signal, the followability of the laser beam can be enhanced without attenuating the degree of learning. In the optical disc device having such repetitive control (learning control) system, since the followability to the periodic target can be enhanced without increasing the control band relative to the focus/tracking control comprising the direct feedback control, it is possible to deal with a system having narrow tracks, a system having a large eccentricity, and a system having a high disc rotation speed (a system having a high transfer rate).

Patent Document 1: Japanese Published Patent Application No. Hei. 9-50303

DISCLOSURE OF THE INVENTION

Problems to be Solved by the Invention

However, when the optical disc device using the conventional cyclic memory performs a high-speed recording/reproduction operation, an unignorable phase difference occurs between the signal of just-previous one period stored in the memory and the compensation target signal just being detected from the optical pickup when feeding back the signal of just-previous one period stored in the memory, and this phase difference causes a residual deviation, and eventually, the deviation cannot be sufficiently reduced.

The present invention is made to solve the above-described problems and has for its object to provide a cyclic memory which does not deteriorate the followability even when a large difference in phase amount occurs between a signal of just-previous one period stored in the memory and a signal currently being detected, and a disc device including the cyclic memory.

Measures to Solve the Problems

In order to solve the above-described problems, according to Claim 1 of the present invention, there is provided a cyclic memory which performs repetitive control for a compensation target signal, comprising: an adder to which a compensation target signal having a periodic frequency component is inputted, and a feedback signal system for successively updating and storing into a memory an output signal of the adder for each one period, and inputting the information of one period stored in the memory back to the adder, wherein the feedback signal system includes a filter unit for outputting a signal component included in a learning frequency band that is arbitrarily set among the output signal of the adder, a memory for successively updating and storing the output signal of the filter unit, a phase correction unit for arbitrarily setting, when inputting the output signal from the memory to the adder, a phase amount of the signal, and a gain element for multiplying the information of one period that is phase-corrected by the phase correction unit by a value not less than 0 and not larger than 1, and inputting the product to the adder.

Therefore, a difference in phase between the signal outputted from the memory and the compensation target signal just being detected from the optical pickup can be corrected, and thus a cyclic memory which would not deteriorate the followability even when performing high-speed recording/reproduction is obtained.

According to Claim 2 of the present invention, there is provided a cyclic memory which performs repetitive control for a compensation target signal that is read out from a disc, comprising: an adder to which a compensation target signal having a periodic frequency component is inputted, a feedback signal system for successively updating and storing into a memory an output signal of the adder for each one period, and inputting the information of one period stored in the memory back to the adder, and an rpm detection unit for detecting the rpm of the disc, wherein the feedback signal system includes a filter unit for outputting a signal component included in a learning frequency band that is arbitrarily set among the output signal of the adder, a memory for successively updating and storing the output signal of the filter unit, a phase correction unit for arbitrarily setting, when inputting the output signal from the memory to the adder, a phase amount of the signal according to the rpm of the disc, and a gain element for multiplying the information of one period that is phase-corrected by the phase correction unit by a value not less than 0 and not larger than 1, and inputting the product to the adder.

Therefore, a difference in phase between the signal outputted from the memory and the compensation target signal just being detected from the optical pickup can be corrected according to the number of rotations of the disc, and thus a cyclic memory which would not deteriorate the followability even when the number of rotations of the disc varies is obtained.

According to Claim 3 of the present invention, there is provided a cyclic memory which performs repetitive control for a compensation target signal that is read from a disc, comprising: an adder to which a compensation target signal having a periodic frequency component is inputted, a feedback signal system for successively updating and storing into a memory an output signal of the adder for each one period, and inputting the information of one period stored in the memory back to the adder, and a position detection unit for detecting the position of an optical pickup in the radial direction of the disc, wherein the feedback signal system includes a filter unit for outputting a signal component included in a learning frequency band that is arbitrarily set among the output signal of the adder, a memory for successively updating and storing the output signal of the filter unit, a phase correction unit for arbitrarily setting, when inputting the output signal from the memory to the adder, a phase amount of the signal according to the position of the optical pickup in the radial direction of the disc, and a gain element for multiplying the information of one period that is phase-corrected by the phase correction unit by a value not less than 0 and not larger than 1, and inputting the product to the adder.

Therefore, a difference in phase between the signal outputted from the memory and the compensation target signal just being detected from the optical pickup can be corrected irrespective of at which position in the radial direction of the disc the optical pickup is located, and thus a cyclic memory which would not deteriorate the followability irrespective of the position of the optical pickup in the radial direction of the disc is obtained.

According to Claim 4 of the present invention, there is provided a disc device for optically or magnetically recording/reproducing information to a disc, including: a head control system for controlling an actuator or a motor which locates a light/magnetism generating head at a predetermined position on the disc, the head control system having a cyclic memory which performs repetitive control for a compensation target signal; wherein the cyclic memory includes an adder to which a compensation target signal having a periodic frequency component is inputted, and a feedback signal system for successively updating and storing into a memory an output signal of the adder for each one period, and inputting the information of one period stored in the memory back to the adder, and the feedback signal system includes a filter unit for outputting a signal component included in a learning frequency band that is arbitrarily set among the output signal of the adder, a memory for successively updating and storing the output signal of the filter unit, a phase correction unit for arbitrarily setting, when inputting the output signal from the memory to the adder, a phase amount of the signal, and a gain element for multiplying the information of one period that is phase-corrected by the phase correction unit by a value not less than 0 and not larger than 1, and inputting the product to the adder.

Therefore, a difference in phase between the signal outputted from the memory and the compensation target signal just being detected from the optical pickup can be corrected, and thus an optical disc device which would not deteriorate the followability even when performing high-speed recording/reproduction is obtained.

According to Claim 5 of the present invention, there is provided a disc device for optically or magnetically recording/reproducing information to a disc, including: a head control system for controlling an actuator or a motor which locates a light/magnetism generating head at a predetermined position on the disc, the head control system having a cyclic memory which performs repetitive control for a compensation target signal; wherein the cyclic memory includes an adder to which a compensation target signal having a periodic frequency component is inputted, a feedback signal system for successively updating and storing into a memory an output signal of the adder for each one period, and inputting the information of one period stored in the memory back to the adder, and an rpm detection unit for detecting the rpm of the disc, and the feedback signal system includes a filter unit for outputting a signal component included in a learning frequency band that is arbitrarily set among the output signal of the adder, a memory for successively updating and storing the output signal of the filter unit, a phase correction unit for arbitrarily setting, when inputting the output signal from the memory to the adder, a phase amount of the signal according to the rpm of the disc, and a gain element for multiplying the information of one period that is phase-corrected by the phase correction unit by a value not less than 0 and not larger than 1, and inputting the product to the adder.

Therefore, a difference in phase between the signal outputted from the memory and the compensation target signal just being detected from the optical pickup can be corrected according to the number of rotations of the disc, and thus an optical disc device which would not deteriorate the followability even when the number of rotations of the disc varies is obtained.

According to Claim 6 of the present invention, there is provided a disc device for optically or magnetically recording/reproducing information to a disc, including: a head control system for controlling an actuator or a motor which locates a light/magnetism generating head at a predetermined position on the disc, the head control system having a cyclic memory which performs repetitive control for a compensation target signal; wherein the cyclic memory includes an adder to which a compensation target signal having a periodic frequency component is inputted, a feedback signal system for successively updating and storing into a memory an output signal of the adder for each one period, and inputting the information of one period stored in the memory back to the adder, and a position detection unit for detecting the position of an optical pickup in the radial direction of the disc, and the feedback signal system includes a filter unit for outputting a signal component included in a learning frequency band that is arbitrarily set among the output signal of the adder, a memory for successively updating and storing the output signal of the filter unit, a phase correction unit for arbitrarily setting, when inputting the output signal from the memory to the adder, a phase amount of the signal according to the position of the optical pickup in the radial direction of the disc, and a gain element for multiplying the information of one period that is phase-corrected by the phase correction unit by a value not less than 0 and not larger than 1, and inputting the product to the adder.

Therefore, a difference in phase between the signal outputted from the memory and the compensation target signal just being detected from the optical pickup can be corrected irrespective of at which position in the radial direction of the disc the optical pickup is located, and thus an optical disc device which would not deteriorate the followability irrespective of the position of the optical pickup is obtained.

Effects of the Invention

The cyclic memory of the present invention is constructed to correct the phase difference between the signal outputted from the memory and the compensation target signal just being detected from the optical pickup when performing high speed recording or the like in the optical disc device. Thus, the followability would not be deteriorated even when the phase difference between the signal of just-previous one period and the signal just being detected is large.

Further, the cyclic memory of the present invention is constructed to correct the phase difference between the signal outputted from the memory and the compensation target signal just being detected from the optical pickup according to the number of rotations of the disc. Thus, the followability would not be deteriorated even when the number of rotations of the disc varies.

Further, the cyclic memory of the present invention is constructed to correct the phase difference between the signal outputted from the memory and the compensation target signal just being detected from the optical pickup according to the position of the optical pickup. Thus, the followability would not be deteriorated irrespective of at which position in the radial direction of the disc the optical pickup is located.

Further, the disc device of the present invention is provided with the cyclic memory for correcting the phase difference between the signal of just-previous one period and the signal just being detected, in the control system which controls the actuator or the motor for locating the light/magnetism generating head at a predetermined position on the disc. Thus, the followability in the focus/tracking control during high-speed recording/reproduction can be enhanced, thereby significantly reducing the residual deviation.

DESCRIPTION OF REFERENCE NUMERALS

1 . . . first adder
2 . . . attenuation gain
3 . . . low-pass filter
4 . . . memory
5,6 . . . gain elements
7 . . . second adder
8 . . . low-pass filter
9 . . . subtracter
10 . . . absolute value detector
11 . . . comparator
12 . . . correlation detection unit
13 . . . adder
14 . . . gain element
15 . . . memory
16a . . . low-pass filter
16b . . . high-pass filter
17 . . . filter unit
18 . . . element
19 . . . phase correction unit
20 . . . controller
21 . . . feedback signal system
22 . . . target to be followed
23 . . . actuator driving signal 24 . . . error signal
25 . . . rpm detection unit
26 . . . position detection unit
100,100a,100b . . . cyclic memory
110 . . . optical disc
111 . . . spindle motor
112 . . . optical head
113 . . . rough moving mechanism
114 . . . recording/reproduction signal processing system
115 . . . control system
116 . . . rotation control system
117 . . . optical head control system
118 . . . optical head position control system

BEST MODE TO EXECUTE THE INVENTION

Hereinafter, embodiments of the present invention will be described with reference to the drawings. While any disc device which magnetically or optically performs recording/reproduction to a disc can be used as a disc device having a cyclic memory of the present invention, an optical disc device will be described as an example.

(Embodiment 1)

Figure 1:
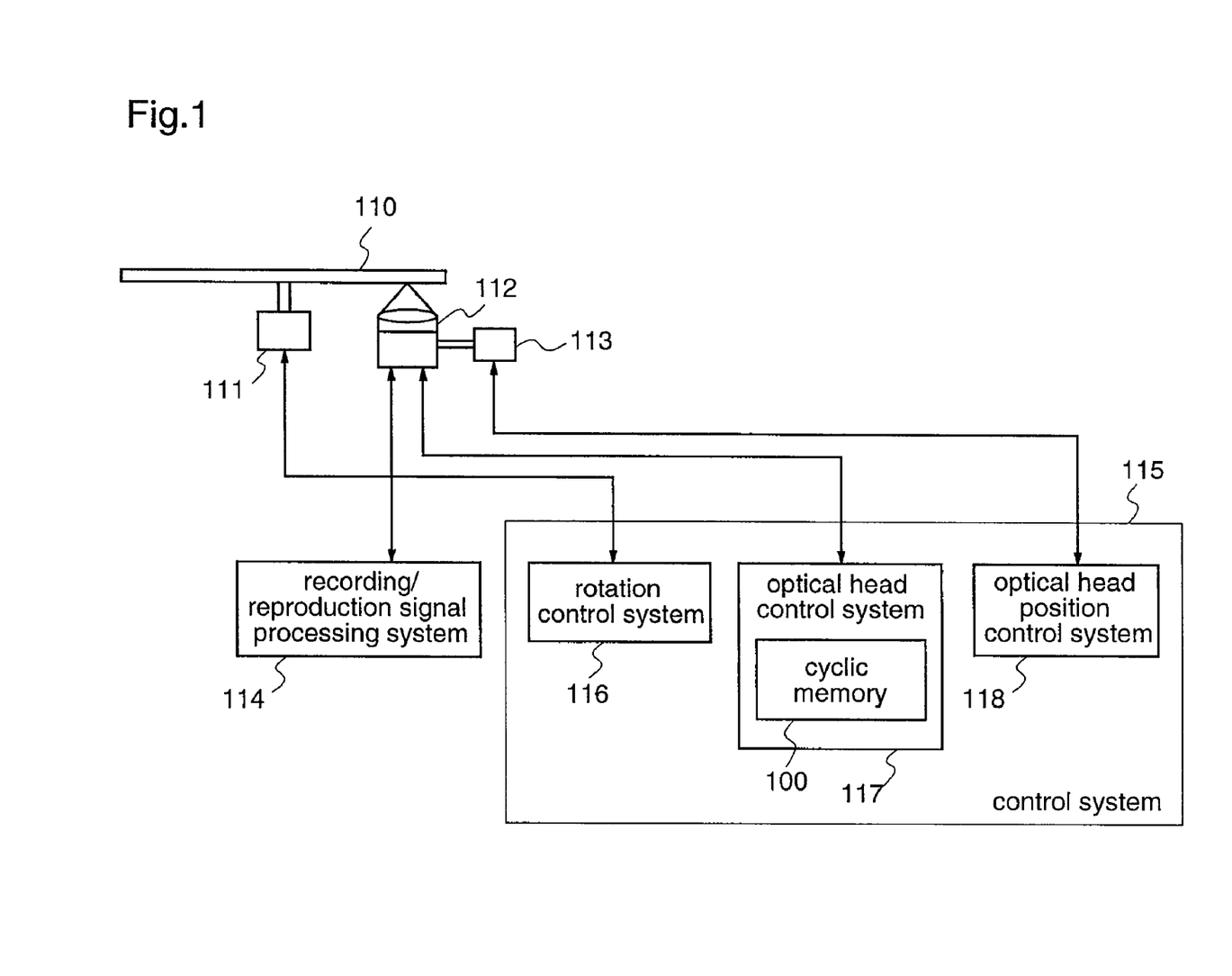
FIG. 1 is a diagram illustrating the construction of an optical disc device having a cyclic memory according to a first embodiment of the present invention.

FIG. 1 is a diagram illustrating the construction of an optical disc device having a cyclic memory 100 according to a first embodiment of the present invention.

With reference to FIG. 1, the optical disc device comprises a recording/reproduction signal processing system 114 for processing recording data to be recorded on an optical disc 110 or reproduction data read from the optical disc 110, and a control system 115 for driving the optical disc device. The control system 115 comprises a rotation control system 116 for controlling a spindle motor 111 which rotates the optical disc 110, an optical head control system 117 for controlling an actuator or motor (not shown) which speedily and precisely drives an optical head 112 in two axial directions, i.e., a light axis direction and a direction perpendicular to the light axis, to focus a light spot emitted from the optical head 112 onto a recording film or a target track on the optical disc 110, and an optical head position control system 118 for controlling a rough movement mechanism 113 which moves the optical head 112 to a position near a desired track.

In this first embodiment, the cyclic memory 100 is provided in the optical head control system 117, and an error signal having a periodic frequency component which occurs due to surface vibration of the optical disc 110 or track vibration caused by displacement of the disc in its radial direction is detected in the optical head control system 117, and the detected error signal is subjected to repetitive control (learning control) in the cyclic memory 100, thereby performing focus control or tracking control with stability.

Figure 2:
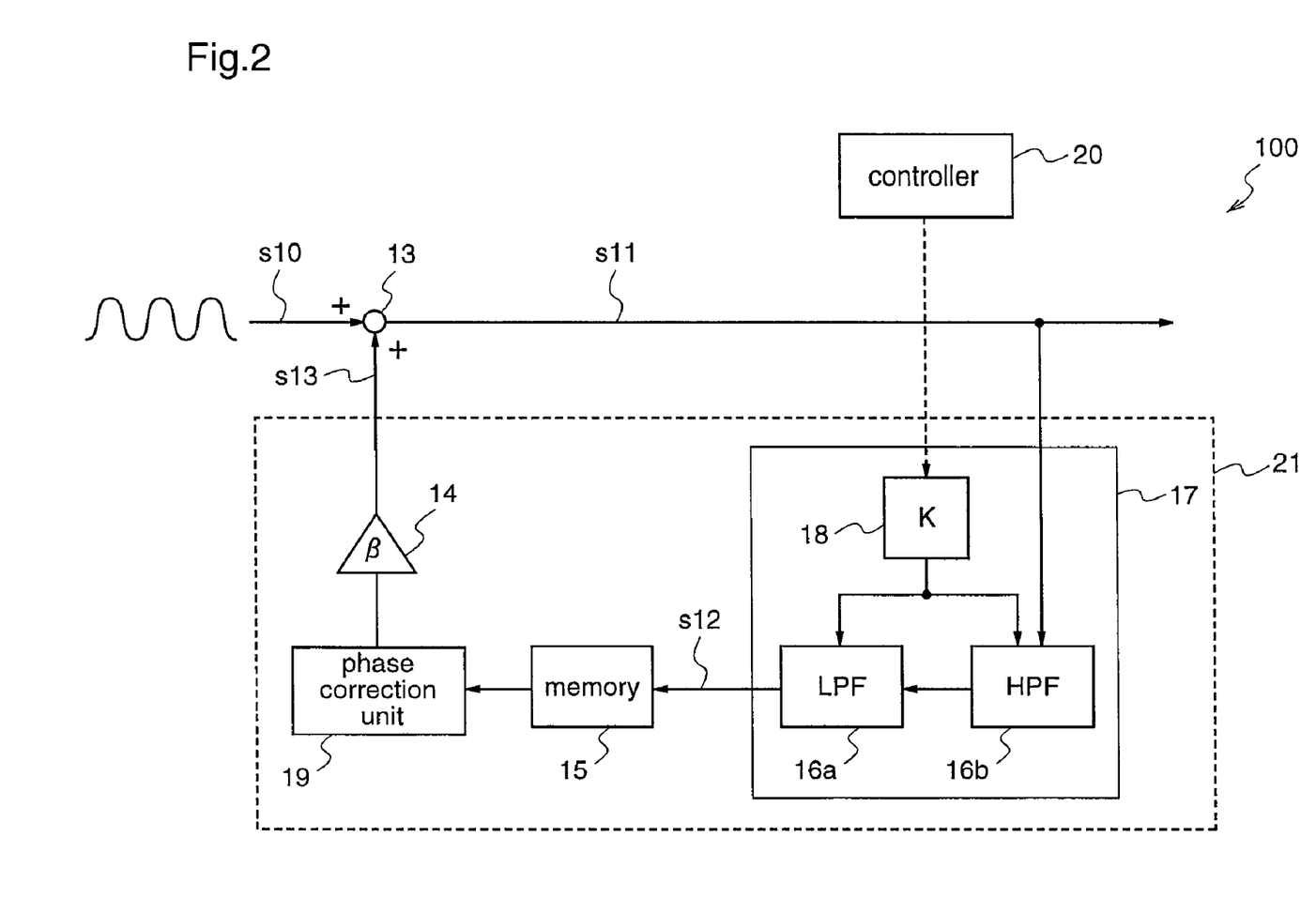
FIG. 2 is a diagram illustrating the construction of the cyclic memory according to the first embodiment.

FIG. 2 is a diagram illustrating the construction of the cyclic memory 100 according to the first embodiment.

In FIG. 2, reference numeral 13 denotes an adder for adding an inputted compensation target signal S10 and an output from a feedback signal system 21 described later. While in this first embodiment an operation when an adder is used is described, similar deviation suppressing effect as in the case of using the adder can be obtained also when a subtracter is used. Reference numeral 21 denotes a feedback signal system for successively updating and storing the output signal from the adder 13 back into the adder 13.

Reference numeral 14 denotes a gain element for multiplying the signal of one period that is stored in the memory 15 by a gain β (0≦β≦1) thereby to change the degree of learning in the cyclic memory 100. The gain β of the gain element 14 is a factor which is made to satisfy β≦1 from the stability condition for the repetitive control so as not to let the degree of learning be 100%. In this way, the gain element 14 serves, by multiplying the output from the memory 15 by the gain β, to make the focus control in the optical disc device stable and enhance only the followability without increasing the control band.

Reference numeral 17 denotes a filter unit which can arbitrarily set a frequency band of a signal to be stored (learned) in the memory 15 among the signal of one period outputted from the adder 13, and this filter unit 17 comprises a low-pass filter 16a, a high-pass filter 16b, and an element 18 for varying the gains and the bands of the low-pass filter 16a and the high-pass filter 16b.

Reference numeral 15 denotes a memory for successively updating and storing the output signal from the filter unit 17, and it stores, with one rotation period of the disc being divided into N, signal information that is a periodic component of one disc rotation. Reference numeral 19 denotes a phase correction unit for arbitrarily setting, when inputting the output signal from the memory 15 into the adder, a phase amount of the signal. The phase correction unit 19 corrects, by varying the readout timing from the memory 15, a phase shift which occurs when constituting the control loop, such as a phase delay caused by the sensitivity of the actuator or the signal passing through the filter unit 17, or a phase delay/phase advance caused by the write-in timing and the readout timing in the memory 15. Reference numeral 20 denotes a controller for controlling the k value in the element 18.

Next, the operation of the cyclic memory 100 constituted as described above will be described. The description will be given of a case where a focus error signal is input to the cyclic memory 100 as a compensation target signal. The focus error signal has a periodic component that is caused by a surface vibration of the disc.

First of all, in the optical disc device, the k value is set in the element 18 via the controller 20 at initial start-up. As for the setting of this k value, there are proposed a method of setting, by the user, an arbitrary value in the element 18 via the controller 20, and a method of obtaining a correlation of the compensation target signal in such as the correlation detection unit shown in FIG. 6, and setting a value based on the correlation result via the controller 20. However, the setting method is not particularly restricted.

Next, when the recording/reproduction operation by the optical disc device is started, the optical disc 110 is rotated, and such as surface vibration of the disc occurs with the disc rotation. At this time, a focus error signal s10 is detected in the optical head control system 117 to be input to the cyclic memory 100.

The focus error signal s10 inputted to the cyclic memory 100 is input to the adder 13, and added to a signal s13 outputted from the feedback signal system 21, and then the resultant signal is outputted from the cyclic memory 100 to be input to the feedback signal system 21.

The signal s11 inputted to the feedback signal system 21 is input to the filter unit 17, and filtered by the high-pass filter 16b and the low-pass filter 16a whose cutoff frequencies are arbitrarily set according to the k value of the element 18.

The signal s12 filtered in the filter unit 17 is stored in the memory 15 as signal information of just-previous one disc rotation, and this stored signal is input to the phase correction unit 19. After the input signal is corrected for its phase amount in the phase correction unit 19, it is multiplied by the gain β in the gain element 14, and then outputted from the feedback signal system 21 to be input to the adder 13.

Thereafter, in the cyclic memory 100, the operation of performing phase correction to the signal of just-previous one period of the focus error signal s10 stored in the memory 15 and then adding the corrected signal multiplied by the gain to the focus error signal, is repeated. While in this first embodiment the operation when the adder is used is described, similar deviation suppressing effect can be obtained also when a subtracter is used.

Next, the function and effect of the cyclic memory 100 according to the first embodiment will be described.

Figure 3:
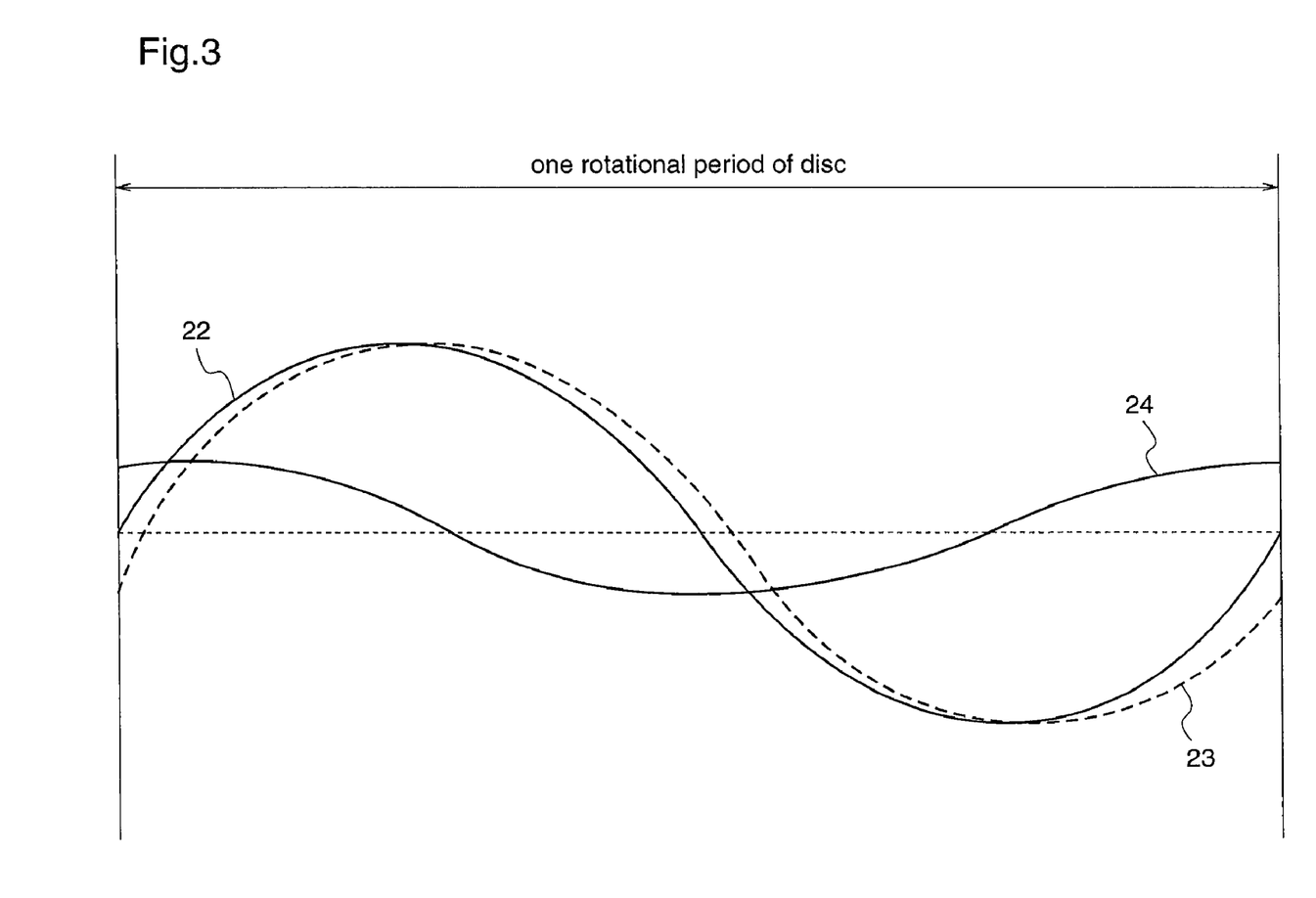
FIG. 3 is a diagram illustrating signal waveforms according to the first embodiment.

Initially, the reason why the cyclic memory 100 is introduced will be described. FIG. 3 is a diagram for explaining the operation of the cyclic memory 100 during focus control. In FIG. 3, reference numeral 22 denotes a target to be followed during the focus control, 23 denotes an actuator driving signal for driving the focus actuator, and 24 denotes an error signal obtained from a difference between the followed target and the driving signal, and any signal is shown for one period of the disc (a period of one disc rotation).

When focus control is performed in the optical disc device, a surface vibration occurs as a target 22 in the focus control as shown in FIG. 3, and the focus actuator must be driven to follow this target 22. So, the cyclic memory 100 is introduced, and a signal of just-previous one period is stored in the memory 15 to be used as a focus actuator driving signal, thereby to approximate an error signal (a residual deviation) obtained from a difference between the followed target and the driving signal to zero.

As shown in FIG. 3, when a phase error amount such as a phase advance or phase delay occurs between the followed target 22 and the actuator driving signal 23 in the focus control, the error signal 24 obtained from the difference between the followed target and the driving signal is increased.

So, in the cyclic memory 100 of the first embodiment, for example, a signal of just-previous one period of the target compensation signal is stored in the memory 15 to be used as a focus actuator driving signal, and thereby the focus actuator is driven so as to follow the compensation target signal. Further, the phase correction unit 19 performs correction for a phase shift which occurs when constituting the control loop, due to such as a phase delay that is caused by the sensitivity of the focus actuator or the signal passing through the filter unit 17, or a phase delay/phase advance that is caused by a difference between the write-in timing and the readout timing in the memory 15. Thereby, the focus control in the optical disc device can be performed stably to enhance the followability without increasing the control band, resulting in a significant reduction in the residual deviation.

While in this first embodiment the compensation target signal s10 inputted to the cyclic memory 100 is a focus error signal, the present invention is not restricted thereto. For example, even when a focus driving signal is used, a deviation suppressing effect that approximates the steady-state deviation to 0 can be obtained. Further, also in tracking control having an eccentricity of the optical disc as a target to be followed, the deviation can be sufficiently reduced by using a tracking error signal as the compensation target signal s10.

As described above, according to the cyclic memory of the first embodiment, when a large difference in phase amount occurs between the signal of just-previous one period and the signal currently being detected which is likely to occur when surface vibration or eccentricity of the disc is considerable during high-speed recording/reproduction of the optical disc device, the phase difference between the both signals is corrected. Thereby, the signal deviation caused by the phase difference is suppressed in the cyclic memory, and thus the followability for the compensation target signal is enhanced. Consequently, the focus/tracking control of the optical pickup can be performed with consistent stability in the optical disc device.

(Embodiment 2)

A cyclic memory relating to a second embodiment of the present invention is constituted to perform, even when the rpm of the disc varies in the cyclic memory of the first embodiment, phase correction according to the rpm to realize appropriate repetitive control.

Figure 4:
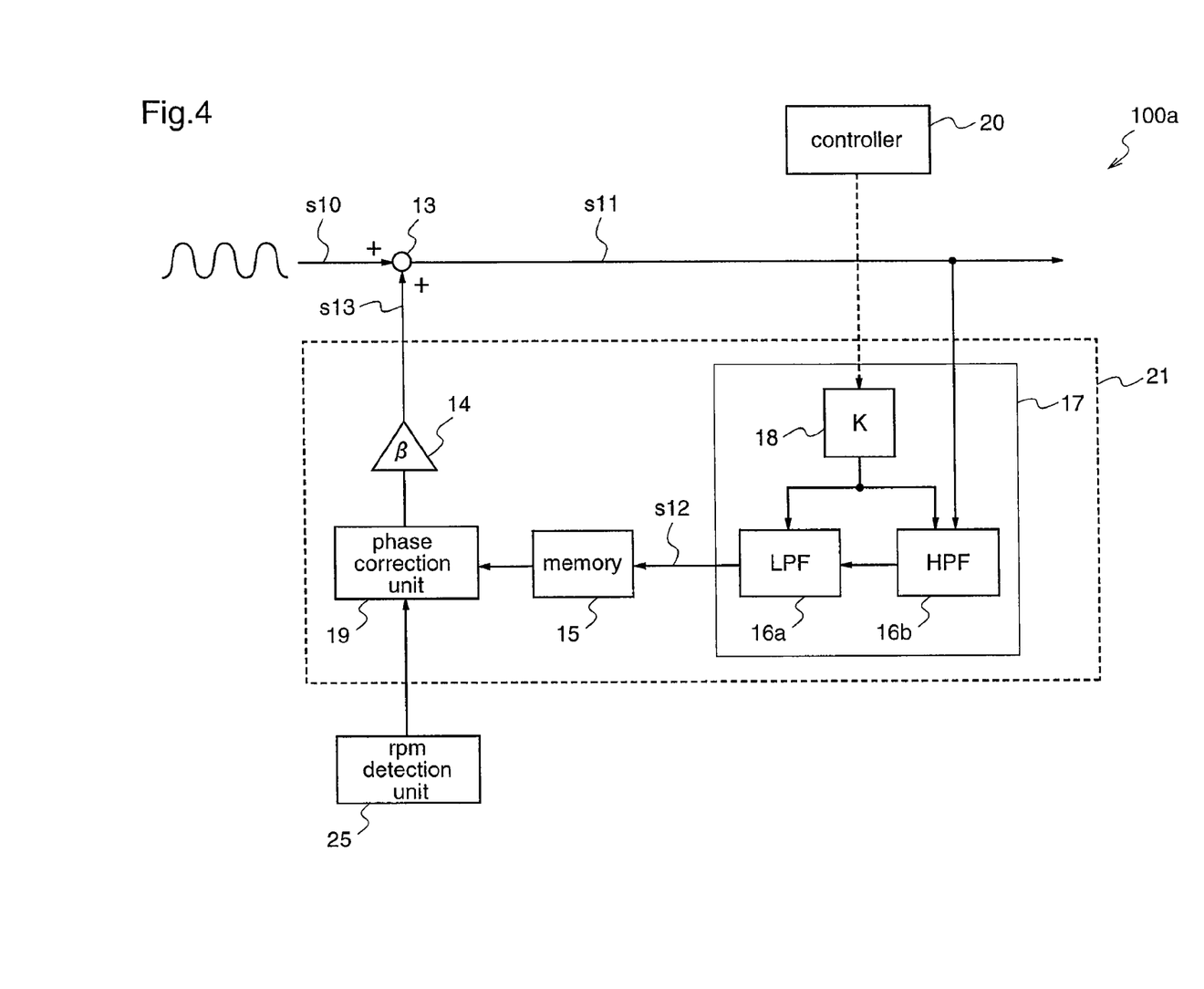
FIG. 4 is a diagram illustrating the construction of a cyclic memory according to a second embodiment of the present invention.

FIG. 4 is a diagram illustrating the construction of the cyclic memory 100a of the second embodiment.

In FIG. 4, reference numeral 25 denotes an rpm detection unit which detects the rpm of the motor according to motor rotation number information of the spindle motor that rotates the optical disc 110, and controls the phase correction unit 19 on the basis of the detection result.

Further, in this second embodiment, the phase correction unit 19 sets a phase correction amount according to the rpm of the motor. For example, when the optical disc device performs recording/reproduction at a high speed, the signal of just-previous one period stored in the memory 15 is shorter in period relative to the signal of just-previous one period stored in the memory 15 when the optical disc device performs recording/reproduction at a low multiple speed, and therefore, the error in the phase amount tends to be larger.

So, the rpm detection unit 25 detects the rpm of the optical disc 110 during the recording/reproduction operation, and the phase correction unit 19 appropriately corrects the phase advance or phase delay amount according to the rpm. Further, the rpm detection unit 25, not only detecting the rpm of the disc during the recording/reproduction operation, can make the phase correction unit 19 appropriately correct the phase advance or phase delay amount even when setting of the rpm is predetermined. By adopting such construction, appropriate phase correction can always be performed irrespective of an increase/decrease in the rpm of the disc or a difference in the disc rotation systems such as CAV and CLV, and thus the focus control in the optical disc device can be stably operated so that the followability can be enhanced without increasing the control band and thereby the residual deviation can be reduced.

Since the other constituents in FIG. 4 are identical to those of the first embodiment, repeated description is not necessary.

Next, the operation of the cyclic memory 100a thus constituted will be described. The description will be given of the case where a focus error signal is input to the cyclic memory 100a as a compensation target signal. This focus error signal s10 has a periodical component that is caused by surface vibration of the disc.

Initially, in the optical disc device, a k value is set in the element 18 via the controller 20 at initial start-up. Further, the rpm detection unit 25 detects the rpm of the optical disc 110 during recording/reproduction, and outputs the same to the phase correction unit 19.

When the recording/reproduction operation by the optical disc device is started, the optical disc 110 is rotated, and such as surface vibration of the disc occurs with the rotation of the disc. At this time, the focus error signal s10 is detected in the optical head control system to be input to the cyclic memory 100a.

The focus error signal s10 inputted to the cyclic memory 100a is input to the adder 13, and added to the signal s13 outputted from the feedback signal system 21, and then the resultant signal is outputted from the cyclic memory 100a to be input to the feedback signal system 21.

The signal s11 inputted to the feedback signal system 21 is input to the filter unit 17, and filtered by the high-pass filter 16b and the low-pass filter 16a whose cutoff frequencies are arbitrarily set according to the k value of the element 18.

The signal s12 filtered by the filter unit 17 is stored in the memory 15 as signal information of just-previous one disc period. This stored signal is input to the phase correction unit 19, and corrected for its phase amount by the phase correction unit 19 according to the rpm of the optical disc 110, and then the phase-corrected signal is outputted from the feedback signal system 21 via the gain element 14 to be input to the adder 13.

Thereafter, in the cyclic memory 100a, the operation of performing phase correction to the signal of just-previous one period of the focus error signal s10 according to the rpm of the optical disc 110, and then adding the corrected signal multiplied by the gain to the focus error signal, is repeated. Thereby, the steady-state deviation is sufficiently suppressed. While in this second embodiment the operation when the adder is used is described, similar deviation suppressing effect can be obtained also when a subtracter is used.

Furthermore, in the cyclic memory 100a of this second embodiment, as in the above-described first embodiment, for example, a signal of just-previous one period of the target compensation signal is stored in the memory 15 to be used as a focus actuator driving signal, and thereby the focus actuator is driven so as to follow the compensation target signal. Further, the phase correction unit 19 performs, according to the disc rpm information from the rpm detection unit 25, correction for a phase shift that occurs when constituting the control loop, due to such as a phase delay caused by the sensitivity of the focus actuator or the signal passing through the filter unit 17, or a phase delay/phase advance caused by a difference between the write-in timing and the readout timing in the memory 15. Thereby, the focus control in the optical disc device can be performed stably to enhance the followability without increasing the control band, resulting in a significant reduction in the residual deviation.

While the second embodiment is described for the case where the compensation target signal s10 inputted to the cyclic memory 100 is a focus error signal, the present invention is not restricted thereto. For example, even when a focus driving signal or the like is used, a deviation suppressing effect that approximates the steady-state deviation to 0 can be obtained. Further, also in tracking control having an eccentricity of the optical disc as a target to be followed, the deviation can be sufficiently suppressed by using a tracking error signal as the compensation target signal s10.

As described above, according to the cyclic memory of this second embodiment, when a large difference in phase amount occurs between the signal of just-previous one period and the signal currently being detected which is likely to occur during high-speed recording/reproduction of the optical disc device, correction of the phase amounts is performed according to the rpm of the disc in the optical disc device. Thereby, in the cyclic memory, the signal deviation caused by the phase difference is suppressed irrespective of an increase/decrease in the disc rpm, and thus the followability for the compensation target signal is enhanced. Consequently, the focus/tracking control of the optical pickup can be performed with consistent stability in the optical disc device.

(Embodiment 3)

A cyclic memory according to a third embodiment of the present invention is constituted to perform, even when the position of the optical pickup in the radial direction of the optical disc varies in the cyclic memory of the first embodiment, phase correction according to the position information of the optical pickup to realize appropriate repetitive control.

Figure 5:
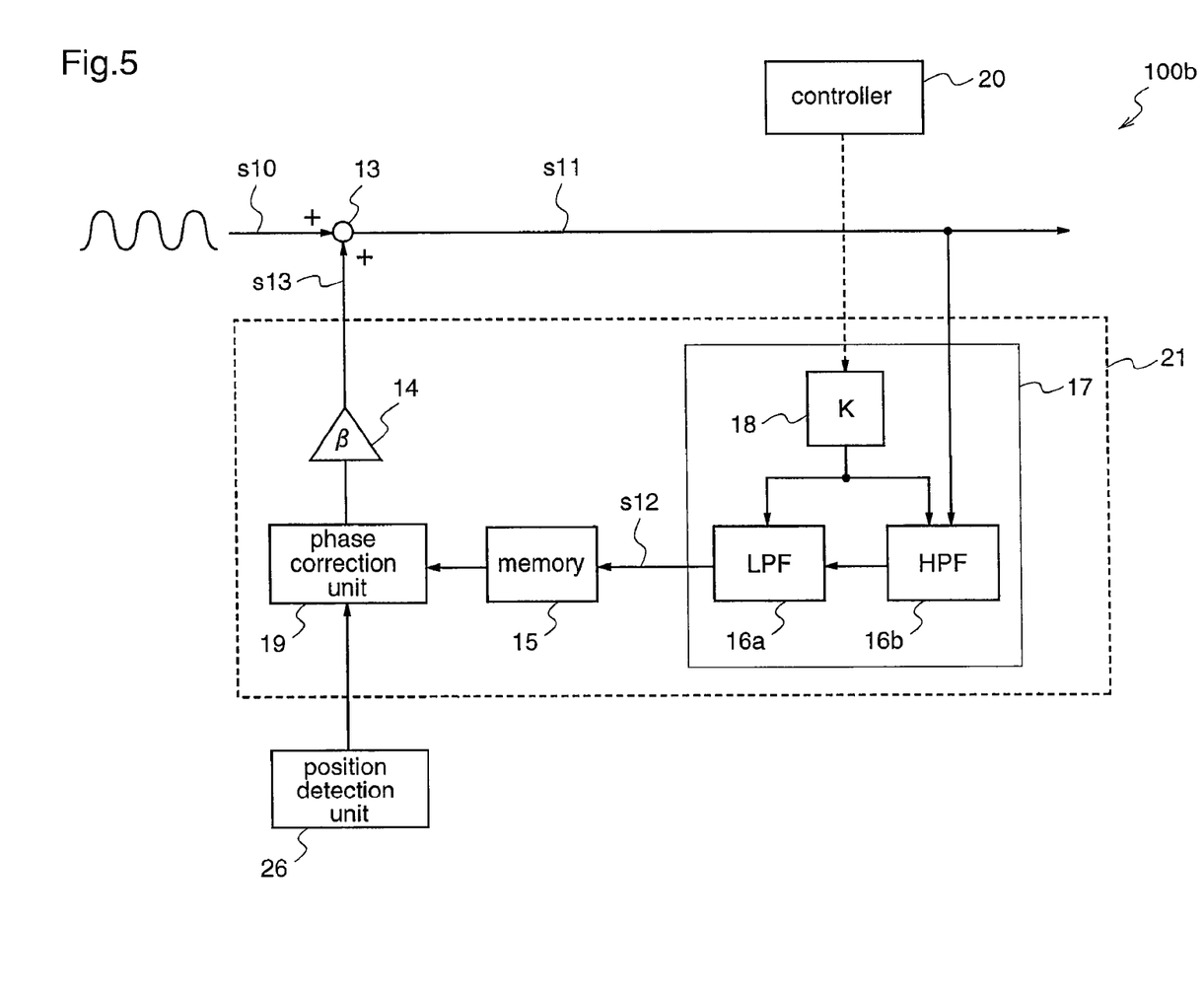
FIG. 5 is a diagram illustrating the construction of a cyclic memory according to a third embodiment of the present invention.

FIG. 5 is a diagram illustrating the construction of the cyclic memory 100b according to the third embodiment.

In FIG. 5, reference numeral 26 denotes a position detection unit for detecting the position of the optical pickup in the radial direction of the optical disc, and controlling the phase correction unit 19 on the basis of the detection result.

In this third embodiment, the phase correction unit 19 sets a phase correction amount according to the position of the optical pickup in the radial direction of the disc, which is detected by the position detection unit 26. For example, when the difference in the phase amount varies depending on the position of the optical pickup in the radial direction of the disc, which is likely to occur when the frequency of the signal of just-previous one period stored in the memory 15 varies or the amplitude of the signal varies between the inner circumference and the outer circumference of the disc in the optical disc device, the phase detection unit 26 detects the position of the optical pickup, and the phase correction unit 19 appropriately corrects the phase advance or phase delay amount according to the position information.

Further, the position detection unit 26, not only detecting the position of the optical pickup during the recording/reproduction operation, can make the phase correction unit 19 correct the phase advance or phase delay amount even when the position to which the optical pickup is moved is predetermined or can be estimated, such as when performing jumping. By adopting such construction, appropriate phase correction can always be performed, and the focus control in the optical disc device can be stably operated so that the followability can be enhanced without increasing the control band and thereby the residual deviation can be suppressed.

Since the other constituents shown in FIG. 5 are identical to those of the first embodiment, repeated description is not necessary.

Next, the operation will be described. The description will be given of the case where a focus error signal is input to the cyclic memory 100b as a compensation target signal. The focus error signal s10 has a periodic component that is caused by surface vibration of the disc.

Initially, in the optical disc device, a k value is set in the element 18 via the controller 20 at initial start-up. Next, when the recording/reproduction operation by the optical disc device is started, the optical disc 110 is rotated, and such as surface vibration of the disc occurs with the rotation of the disc. At this time, a focus error signal s10 is detected in the optical head control system to be input to the cyclic memory 100b. Further, the position of the optical pickup in the radial direction of the disc is detected by the position detection unit 26 to be output to the phase correction unit 19.

The focus error signal s10 inputted to the cyclic memory 100b is input to the adder 13, and added to a signal s13 outputted from the feedback signal system 21, and then the resultant signal is outputted from the cyclic memory 100 to be input to the feedback signal system 21.

The signal s11 inputted to the feedback signal system 21 is input to the filter unit 17, and filtered by the high-pass filter 16b and the low-pass filter 16a whose cutoff frequencies are arbitrarily set according to the k value of the element 18.

The signal s12 filtered by the filter unit 17 is stored in the memory 15 as signal information of just-previous one disc period. This stored signal is input to the phase correction unit 19, and corrected for its phase amount according to the position information of the optical pickup that is detected by the position detection unit 26, and then the phase-corrected signal is outputted from the feedback signal system 21 via the gain element 14 to be input to the adder 13.

Thereafter, in the cyclic memory 100b, the operation of performing phase correction to the signal of just-previous one period of the focus error signal s10 according to the position of the optical pickup in the radial direction of the disc, and then adding the corrected signal multiplied by the gain to the focus error signal, is repeated. Thereby, the steady-state deviation is sufficiently suppressed. While in this third embodiment the operation when the adder is used is described, similar deviation suppressing effect can be obtained also when a subtracter is used.

Further, in the cyclic memory 100b of this third embodiment, as in the above-described first embodiment, for example, a signal of just-previous one period of the target compensation signal is stored in the memory 15 to be used as a focus actuator driving signal, and thereby the focus actuator is driven so as to follow the compensation target signal. Further, the phase correction unit 19 corrects a phase shift that occurs when constituting the control loop according to the position information of the optical pickup from the position detection unit 26. Thereby, the focus control in the optical disc device can be stably performed to enhance the followability without increasing the control band, resulting in a significant reduction in the residual deviation.

While this third embodiment is described for the case where the compensation target signal s10 inputted to the cyclic memory 100b is a focus error signal, the present invention is not restricted thereto. For example, even when a focus driving signal or the like is used, a deviation suppressing effect that approximates the steady-state deviation to 0 can be obtained. Further, by using a tracking error signal as the compensation target signal s10 in tracking control having an eccentricity of the optical disc 110 as a target to be followed, correction for the phase amounts can be appropriately performed according to the position information of the optical pickup in the radial direction of the disc even when performing a seeking operation or a track jumping operation, and thereby the residual deviation can be sufficiently reduced.

As described above, according to the cyclic memory of the third embodiment, when a large difference in phase amount occurs between the signal of just-previous one period and the signal currently being detected which is likely to occur during a seeking operation or a jumping operation, correction of the phase amounts is performed according to the position information of the optical pickup. Thereby, in the cyclic memory, the signal deviation caused by the phase difference can be suppressed irrespective of the position of the optical pickup in the radial direction of the disc, and thus the followability for the compensation target signal is enhanced. Consequently, the focus/tracking control of the optical pickup can be performed with consistent stability in the optical disc device.

APPLICABILITY IN INDUSTRY

A cyclic memory according to the present invention has a repetitive control system, and it is useful for stabilization of focus/tracking control in an optical disc device and for improvement in followability. Further, it is also applicable to speed-up/high-densification of an optical disc device.

The invention claimed is:

1. A cyclic memory which performs repetitive control for a compensation target signal, comprising:
an adder to which a compensation target signal having a periodic frequency component is inputted; and
a feedback signal system for receiving an output signal of adder and inputting an output of the feedback signal system to the adder, said feedback signal system including:
a filter unit for outputting a signal component included in a learning frequency band that is arbitrarily set among the output signal of the adder;
a memory for successively updating and storing the output signal component of the filter unit;
a phase correction unit for correcting, when inputting an outputting signal from the memory to the adder, a phase amount of an outputting signal to the adder; and
a gain element for multiplying an output signal from the phase correction unit for each one period that is phase-corrected by the phase correction unit by a value not less than 0 and not larger than 1, and inputting the product to the adder,
wherein the feedback signal system successively updates and stores into the memory the output signal of the adder for each one period, and inputs the outputting signal stored in the memory for one period stored in the memory back to the adder.

2. A cyclic memory which performs repetitive control for a compensation target signal that is read out from a disc, comprising:
an adder to which a compensation target signal having a periodic frequency component is inputted;
a feedback signal system for receiving an output signal of adder and inputting an output of the feedback signal system to the adder; and
an rpm detection unit for detecting rpm of the disc, wherein said feedback signal system includes:
a filter unit for outputting a signal component included in a learning frequency band that is arbitrarily set among the output signal of the adder;
a memory for successively updating and storing the output signal component of the filter unit;
a phase correction unit for correcting, when inputting an outputting signal from the memory to the adder, a phase amount of an outputting signal to the adder according to the rpm of the disc; and
a gain element for multiplying an output signal from the phase correction unit for each one period that is phase-corrected by the phase correction unit by a value not less than 0 and not larger than 1, and inputting the product to the adder, and
the feedback signal system successively updates and stores into the memory the output signal of the adder for each one period, and inputs the outputting signal stored in the memory for one period stored in the memory back to the adder.

3. A cyclic memory which performs repetitive control for a compensation target signal that is read from a disc, comprising:
an adder to which a compensation target signal having a periodic frequency component is inputted;
a feedback signal system for receiving an output signal of adder and inputting an output of the feedback signal system to the adder; and
a position detection unit for detecting the position of an optical pickup in the radial direction of the disc, wherein:
said feedback signal system includes:
a filter unit for outputting a signal component included in a learning frequency band that is arbitrarily set among the output signal of the adder;
a memory for successively updating and storing the output signal component of the filter unit;
a phase correction unit for correcting, when inputting an outputting signal from the memory to the adder, a phase amount of an outputting signal to the adder according to the position of the optical pickup in the radial direction of the disc; and a gain element for multiplying an output signal from the phase correction unit for each one period that is phase-corrected by the phase correction unit by a value not less than 0 and not larger than 1, and inputting the product to the adder, and the feedback signal system successively updates and stores into the memory the output signal of the adder for each one period, and inputs the outputting signal stored in the memory for of one period stored in the memory back to the adder.

4. A disc device for optically or magnetically recording/reproducing information to a disc, including:

a head control system for controlling an actuator or a motor which locates a light/magnetism generating head at a predetermined position on the disc, said head control system having a cyclic memory which performs repetitive control for a compensation target signal, wherein:

said cyclic memory includes:

an adder to which a compensation target signal having a periodic frequency component is inputted; and a feedback signal system for receiving an output signal of adder and inputting an output of the feedback signal system to the adder, and said feedback signal system includes:

a filter unit for outputting a signal component included in a learning frequency band that is arbitrarily set among the output signal of the adder;

a memory for successively updating and storing the output signal component of the filter unit;

a phase correction unit for correcting, when inputting an outputting signal from the memory to the adder, a phase amount of an outputting signal to the adder; and a gain element for multiplying an output signal from the phase correction unit for each one period that is phase-corrected by the phase correction unit by a value not less than 0 and not larger than 1, and inputting the product to the adder, and the feedback signal system successively updates and stores into the memory the output signal of the adder for each one period, and inputting the outputting signal stored in the memory for one period stored in the memory back to the adder.

5. A disc device for optically or magnetically recording/reproducing information to a disc, including:

a head control system for controlling an actuator or a motor which locates a light/magnetism generating head at a predetermined position on the disc, said head control system having a cyclic memory which performs repetitive control for a compensation target signal, wherein:

said cyclic memory includes:

an adder to which a compensation target signal having a periodic frequency component is inputted, a feedback signal system for receiving an output signal of adder and inputting an output of the feedback signal system to the adder; and an rpm detection unit for detecting the rpm of the disc, said feedback signal system includes:

a filter unit for outputting a signal component included in a learning frequency band that is arbitrarily set among the output signal of the adder;

a memory for successively updating and storing the output signal component of the filter unit;

a phase correction unit for correcting, when inputting an outputting signal from the memory to the adder, a phase amount of an outputting signal to the adder according to the rpm of the disc; and a gain element for multiplying an output signal from the phase correction unit for each one period that is phase-corrected by the phase correction unit by a value not less than 0 and not larger than 1, and inputting the product to the adder, and the feedback signal system successively updates and stores into the memory the output signal of the adder for each one period, and inputting the outputting signal stored in the memory for of one period stored in the memory back to the adder.

6. A disc device for optically or magnetically recording/reproducing information to a disc, including:

a head control system for controlling an actuator or a motor which locates a light/magnetism generating head at a predetermined position on the disc, said head control system having a cyclic memory which performs repetitive control for a compensation target signal; wherein:

said cyclic memory includes:

an adder to which a compensation target signal having a periodic frequency component is inputted;

a feedback signal system for receiving an output signal of adder and inputting an output of the feedback signal system to the adder; and a position detection unit for detecting the position of an optical pickup in the radial direction of the disc, and said feedback signal system includes:

a filter unit for outputting a signal component included in a learning frequency band that is arbitrarily set among the output signal of the adder;

a memory for successively updating and storing the output signal component of the filter unit;

a phase correction unit for correcting, when inputting an outputting signal from the memory to the adder, a phase amount of an outputting signal to the adder according to the position of the optical pickup in the radial direction of the disc; and a gain element for multiplying an output signal from the phase correction unit for each one period that is phase-corrected by the phase correction unit by a value not less than 0 and not larger than 1, and inputting the product to the adder, and the feedback signal system successively updates and stores into the memory the output signal of the adder for each one period, and inputs the outputting signal stored in the memory for one period stored in the memory back to the adder.

* * * * *